US011505922B2

(12) United States Patent
Nishimoto et al.

(10) Patent No.: US 11,505,922 B2
(45) Date of Patent: Nov. 22, 2022

(54) WORKING MACHINE

(71) Applicant: KUBOTA CORPORATION, Osaka (JP)

(72) Inventors: Ryuki Nishimoto, Sakai (JP); Teruhiko Iwamoto, Sakai (JP); Tsutomu Aizawa, Sakai (JP); Makoto Noguchi, Sakai (JP)

(73) Assignee: KUBOTA CORPORATION, Osaka (JP)

(*) Notice: Subject to any disclaimer, the term of this patent is extended or adjusted under 35 U.S.C. 154(b) by 0 days.

(21) Appl. No.: 17/487,676

(22) Filed: Sep. 28, 2021

(65) Prior Publication Data
US 2022/0018094 A1 Jan. 20, 2022

Related U.S. Application Data

(63) Continuation of application No. PCT/JP2019/049665, filed on Dec. 18, 2019.

(30) Foreign Application Priority Data

Mar. 29, 2019 (JP) .............................. JP2019-066395

(51) Int. Cl.
E02F 9/22 (2006.01)
F16H 61/4069 (2010.01)
F16H 61/42 (2010.01)

(52) U.S. Cl.
CPC .......... E02F 9/2253 (2013.01); E02F 9/2289 (2013.01); E02F 9/2296 (2013.01); F16H 61/4069 (2013.01); F16H 61/42 (2013.01)

(58) Field of Classification Search
CPC .... F16H 61/4069; F16H 61/42; F16H 61/438; F16H 61/439
(Continued)

(56) References Cited

U.S. PATENT DOCUMENTS 3,803,843 A * 4/1974 Nyman ............... B60W 30/188
60/449
5,184,466 A * 2/1993 Schniederjan ........ F16H 61/431
60/449
(Continued)

FOREIGN PATENT DOCUMENTS

JP 6-58407 A 3/1994
JP 11-94075 A 4/1999
(Continued)

Primary Examiner — Michael Leslie
(74) Attorney, Agent, or Firm — Birch, Stewart, Kolasch & Birch, LLP

(57) ABSTRACT

The working machine includes a traveling device, a traveling motor, a hydraulic pump including a swashplate, a prime mover to drive the hydraulic pump, a first servo-cylinder to set an angle of the swashplate, a charge pump to supply pilot fluid to the first servo-cylinder, a switching valve shiftable between a traveling position to supply the pilot fluid from the charge pump to the first servo-cylinder and a neutral position to stop the pilot fluid supply to the first servo-cylinder, a switching operation member operable to select either a traveling mode or a neutral mode, and a controller to shift the switching valve between the traveling position and the neutral position. The controller holds the switching valve at the neutral position after the switching operation member is operated to select the traveling mode until a rotation speed of the prime mover becomes not less than a first predetermined rotation speed.

7 Claims, 4 Drawing Sheets

(58) Field of Classification Search
USPC .................................................. 60/491, 492
See application file for complete search history.

(56) References Cited

U.S. PATENT DOCUMENTS

| | | | | |
|---|---|---|---|---|
| 5,447,029 | A * | 9/1995 | Swick ..................... | F16H 61/42 |
| | | | | 60/494 |
| 6,109,031 | A * | 8/2000 | Katagiri .................. | F16H 47/04 |
| | | | | 60/431 |
| 6,250,077 | B1 * | 6/2001 | Iino ........................ | F16H 61/46 |
| | | | | 180/338 |
| 7,895,834 | B2 * | 3/2011 | Sakamoto ............. | F16H 61/433 |
| | | | | 60/452 |

FOREIGN PATENT DOCUMENTS

| JP | 2011-231821 A | 11/2011 |
|---|---|---|
| JP | 2014-190235 A | 10/2014 |

* cited by examiner

WORKING MACHINE

CROSS REFERENCE TO RELATED APPLICATIONS

This application is a continuation application of International Application No. PCT/JP2019/049665, filed on Dec. 18, 2019, which claims the benefit of priority to Japanese Patent Application No. 2019-066395, filed on Mar. 29, 2019. The entire contents of each of these applications are hereby incorporated herein by reference.

BACKGROUND OF THE INVENTION

Field of the Invention

The present invention relates to a working machine such as a wheel loader.

Description of the Related Art

A wheel loader disclosed in Japanese Unexamined Patent Publication No. 2014-190235 is known.

The wheel loader disclosed in Japanese Unexamined Patent Publication No. 2014-190235 includes an HST pump configured to be driven by the engine, an HST motor configured to be driven by hydraulic fluid (pilot fluid) delivered from the HST pump, a servo-cylinder configured to control a swashplate of the HST pump, and a forward/backward-traveling switching valve connected to the servo-cylinder and being switched between a forward-traveling position and a backward-traveling position.

When the forward/backward-traveling switching valve is in the forward-traveling position, a pilot pressure of the pilot fluid acts on a forward-traveling port of the servo-cylinder, and when the forward/backward-traveling switching valve is in the backward-traveling position, the pilot pressure acts on the backward-traveling port of the servo-cylinder, thereby switching a traveling direction of the wheel loader to a forward direction or a backward direction. In the technique disclosed in Japanese Unexamined Patent Publication No. 2014-190235, a control pressure to control an engine rotation speed and a swashplate of the HST pump is changed by depressing an accelerator pedal, thereby controlling a vehicle speed.

SUMMARY OF THE INVENTION

However, in the technology of Japanese Unexamined Patent Publication No. 2014-190235, when the forward/backward-traveling switching valve is in the forward-traveling position or the backward-traveling position, the working device may move forward or backward even when an operator is not operating the accelerator (so-called the creeping phenomenon).

Therefore, in view of the above-mentioned problems, the present invention intends to prevent a working machine from moving forward or backward under a state where the accelerator is not being operated.

A working machine according to an aspect of the present invention, includes a traveling device, a traveling motor to output power to the traveling device, a hydraulic pump, including a swashplate, to supply hydraulic fluid to the traveling motor, a prime mover to drive the hydraulic pump, a first servo-cylinder to set an angle of the swashplate of the hydraulic pump, a charge pump to supply pilot fluid to the first servo-cylinder, a switching valve shiftable between a traveling position to supply the pilot fluid from the charge pump to the first servo-cylinder and a neutral position to stop the pilot fluid supply to the first servo-cylinder, a switching operation member operable to select either a traveling mode or a neutral mode, and a controller to shift the switching valve between the traveling position and the neutral position. The controller is configured or programmed to hold the switching valve at the neutral position after the switching operation member is operated to select the traveling mode until a rotation speed of the prime mover becomes not less than a first predetermined rotation speed.

In addition, the working machine further includes an accelerator operable to set a rotation speed of the prime mover. The controller is configured or programmed to shift the switching valve when a set rotation speed defined as the rotation speed set by the accelerator is not less than the first predetermined rotation speed.

In addition, the working machine further includes a display configured to display the mode selected by operating the switching operation member when the switching operation member is operated to select the mode.

In addition, the controller is configured or programmed to shift the switching valve having been set at the traveling position to the neutral position when the set rotation speed becomes not more than a second predetermined rotation speed that is less than the first predetermined rotation speed.

In addition, the controller is configured or programmed to shift the switching valve having been set at the traveling position to the neutral position after a period of time not shorter than a predetermined period elapses since the set rotation speed becomes not more than the second predetermined rotation speed.

In addition, the traveling mode includes a forward traveling mode and a backward traveling mode, the switching operation member is operable to select one of the forward traveling mode, the neutral mode and the backward traveling mode, the traveling motor is configured to selectively output either a forward traveling power or a backward traveling power to the traveling device in correspondence to a state of hydraulic fluid supply from the hydraulic pump, the swashplate of the hydraulic pump is tiltable between a forward traveling side to make the hydraulic pump deliver hydraulic fluid to drive the traveling motor in the forward traveling direction and a backward traveling side to make the hydraulic pump deliver hydraulic fluid to drive the traveling motor in the backward traveling direction, and the switching valve is shiftable among a forward traveling position to supply the first servo-cylinder with pilot fluid such as to tilt the swashplate to the forward traveling side, the neutral position, and a backward traveling position to supply the first servo-cylinder with pilot fluid such as to tilt the swashplate to the backward traveling side.

In addition, the working machine further includes a speed-shift mechanism configured to shift a speed of the traveling device by adjusting the rotation speed of the traveling motor, a first fluid passage fluidly connecting the first servo-cylinder to the switching valve, and a second fluid passage branched from the first fluid passage and connected to the speed-shift mechanism.

In addition, the speed-shift mechanism includes a second servo-cylinder to set an angle of a swashplate to change the rotation speed of the traveling motor, a speed-shift valve shiftable among a plurality of shift positions to control a telescopic action of the second servo-cylinder in correspondence to at which of the shift positions the speed-shift valve is set, an actuation valve shiftable between a locking position to lock the speed-shift valve at a predetermined shift position and an allowance position to allow the shiftability of the speed-shift valve, and an interlocking valve shiftable interlockingly with the switching valve and fluidly connectable to the speed-shift valve and the actuation valve.

In addition, the working machine further includes an inching pedal, and an inching valve configured to reduce the pilot fluid supplied to the switching valve when the inching pedal is operated.

According to the above-mentioned configuration, the working machine can be prevented from moving forward or backward under a state where the accelerator is not being operated.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
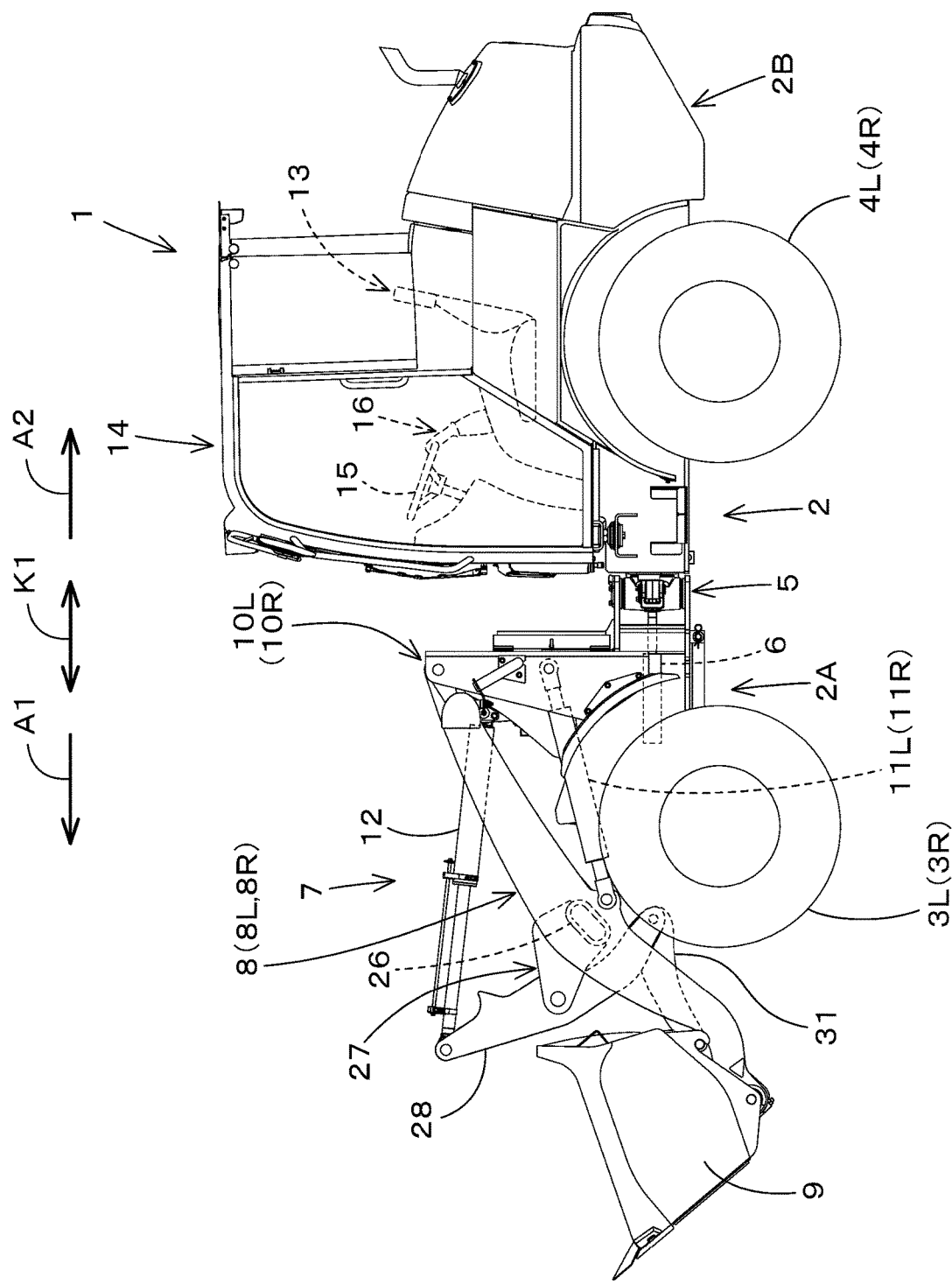
FIG. 1 is a side view of a working machine.

The preferred embodiments will now be described with reference to the accompanying drawings, wherein like reference numerals designate corresponding or identical elements throughout the various drawings. The drawings are to be viewed in an orientation in which the reference numerals are viewed correctly.

An embodiment of the present invention will be described below with appropriate reference to the drawings.

Figure 2:
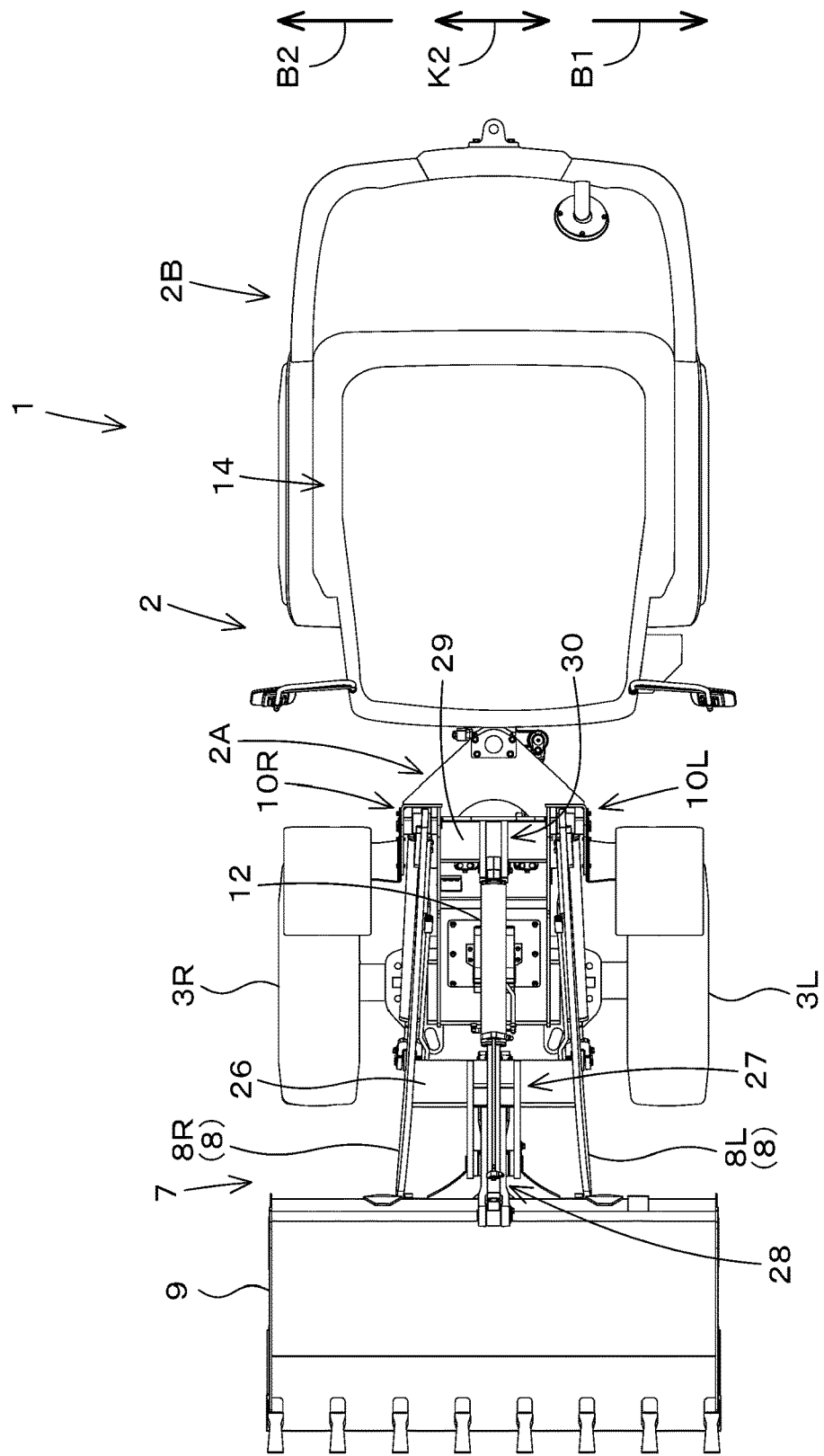
FIG. 2 is a plan view of the working machine.

FIG. 1 is a schematic side view showing an overall configuration of the working machine 1 according to the present embodiment. FIG. 2 is a schematic plan view of the working machine 1. In the present embodiment, a wheel loader is exemplified as the working machine 1.

As shown in FIGS. 1 and 2, the wheel loader according to the present embodiment is an articulated working machine 1, and a machine body 2 of the working machine 1 includes a front machine body 2A and a rear machine body 2B. The front machine body 2A is provided with a left front wheel 3L and a right front wheel 3R. The front wheel 3L is provided on a left portion of the front machine body 2A, and the front wheel 3R is provided on a right portion of the front machine body 2A. The rear machine body 2B is provided with a left rear wheel 4L and a right rear wheel 4R. The rear wheel 4L is provided on a left portion of the rear machine body 2B, and the rear wheel 4R is provided on a right portion of the rear machine body 2B. An operator seat (seat) 13 on which an operator (driver) sits is mounted on the rear machine body 2B. The operator seat 13 is disposed between the rear wheels 4L and 4R, and is provided in a center portion of the machine body 2 in a machine width direction D2.

In the present embodiment, a forward direction (a direction indicated by an arrowed line A1 in FIGS. 1 and 2) of the operator seated on the operator seat 13 is referred to as "front" or "forward", a rearward direction (a direction indicated by an arrowed line A2 in FIGS. 1 and 2) of the operator is referred to as "rear" or "rearward", a leftward direction (front surface side of FIG. 1, a direction indicated by an arrowed line B1 in FIG. 2) of the operator is referred to as "left" or "leftward", and a rightward direction (a back surface side of FIG. 1, a direction indicated by an arrowed line B2 in FIG. 2) of the operator is referred to as "right" or "rightward".

In addition, a horizontal direction, which is orthogonal to a machine fore-and-aft direction K1, is referred to as the machine width direction K2 (see FIG. 2). Each of directions from the center portion of the machine body 2 in the width direction to the right and from the center portion to the left is referred to as a machine outward direction. In other words, the machine outward direction is a direction separating away from the center portion of the machine body 2 in the machine width direction K2. The direction opposite to the machine outward direction is referred to as a machine inward direction. That is, the machine inward direction is a direction approaching the center portion of the machine body 2 in the machine width direction K2.

As shown in FIG. 1, a machine body joint member 5 is provided on a front end portion of the rear machine body 2B rotatably in a predetermined range around an axial center extending in the machine fore-and-aft direction K1, and a rear end portion of the front machine body 2A is jointed to the machine body joint member 5 swingably in the machine width direction K2 around a vertical axis (an axis extending in a vertical direction).

A steering cylinder 6 consisted of a hydraulic cylinder is interposed between the machine body joint member 5 and the front machine body 2A. By telescoping this steering cylinder 6, the front machine body 2A is swung in the machine width direction K2 relative to the rear machine body 2B, and thus the working machine 1 can turn to the left or the right.

The rear machine body 2B is provided with a cabin 14 serving as an operator seat protection device that surrounds the operator seat 13. In a room of the cabin 14, a steering wheel 15 (steering member) for operating the steering cylinder 6 and a manipulation lever 16 for manipulating the working device 7 are provided. The steering wheel 15 is disposed in front of the operator seat 13, and the manipulation lever 16 is disposed on a lateral side (a right side) of the operator seat 13.

A prime mover 17 is mounted on the rear machine body 2B. The prime mover 17 is a diesel engine. However, a configuration of the prime mover 17 is not limited to a particular configuration, and may be, for example, a gasoline engine, an electric motor, or a hybrid system having an engine and an electric motor. A canopy may serve as an alternative operator seat protection device.

As shown in FIGS. 1 and 2, a working device 7 (front working device) is provided on the front machine body 2A. The working device 7 has lift arms 8 that are supported by the front machine body 2A (machine body 2) swingably up and down. The lift arms 8 include a left first arm 8L and a right second arm 8R juxtaposed at intervals in the machine width direction D2. The first arm 8L includes a base end portion (rear end portion) supported, rotatably around an axial center extending in the machine width direction K2, on an upper portion of a first supporting frame 10L erected on a left side portion of the front machine body 2A. Accordingly, the first arm 8L can be swung up and down. The second arm 8R includes a base end portion supported, rotatably around an axial center extending in the machine width direction K2, on an upper portion of a second supporting frame 10R erected on a right side portion of the front machine body 2A. Accordingly, the second arm 8R is also can be swung up and down.

As shown in FIG. 1, a lift cylinder 11L is interposed between a longitudinally intermediate portion of the first arm 8L and a vertically intermediate portion of the first supporting frame 10L. A lift cylinder 11R is interposed between a longitudinally intermediate portion of the second arm 8R and a vertically intermediate portion of the second supporting frame 10R. The lift cylinder 11L and the lift cylinder 11R are constituted of double-action hydraulic cylinders. By telescoping the lift cylinder 11L and the lift cylinder 11R, the lift arms 8 are swung up and down (the first arm 8L and the second arm 8R are simultaneously swung).

The working device 7 includes the working tool 9 capable of being detachably attached to front portions of the lift arms 8. As for the working tool 9, a bucket is attached as standard equipment, and instead of the bucket, a working tool (attachment) such as a pallet fork, a mania fork, or the like, or a working tool with a hydraulic actuator (hydraulic attachment) such as a sweeper, a mower, a breaker, or the like can be attached. A back lower portion of the working tool 9 is connected to and pivotally supported by tip portions (front end portions) of the lift arms 8.

The working machine 1 includes a working tool cylinder 12 configured to drive the working tool 9. The working tool cylinder 12 is constituted of a double-action hydraulic cylinder. In addition, a bracket member 27 is fixed to the connecting pipe 26, and a vertically intermediate portion of the swinging linkage 28 is pivotally supported by the bracket member 27. One end of the working tool cylinder 12 is connected to an upper portion of the swinging linkage 28. The other end of the working tool cylinder 12 is pivotally supported by a bracket member 30 provided on a connecting member 29 that connects the first supporting frame 10L to the second supporting frame 10R. A rear portion of an interlocking linkage 31 is pivotally supported by a lower portion of a swinging linkage 28. A front portion of the interlocking linkage 31 is pivotally supported by (engaged with) the back upper portion of the working tool 9. Through a telescopic action of the working tool cylinder 12, the swinging linkage 28 swings, and the interlocking linkage 31 moves back and forth. This causes the working tool 9 to swing up and down around a connecting point with the lift arms 8.

Figure 3:
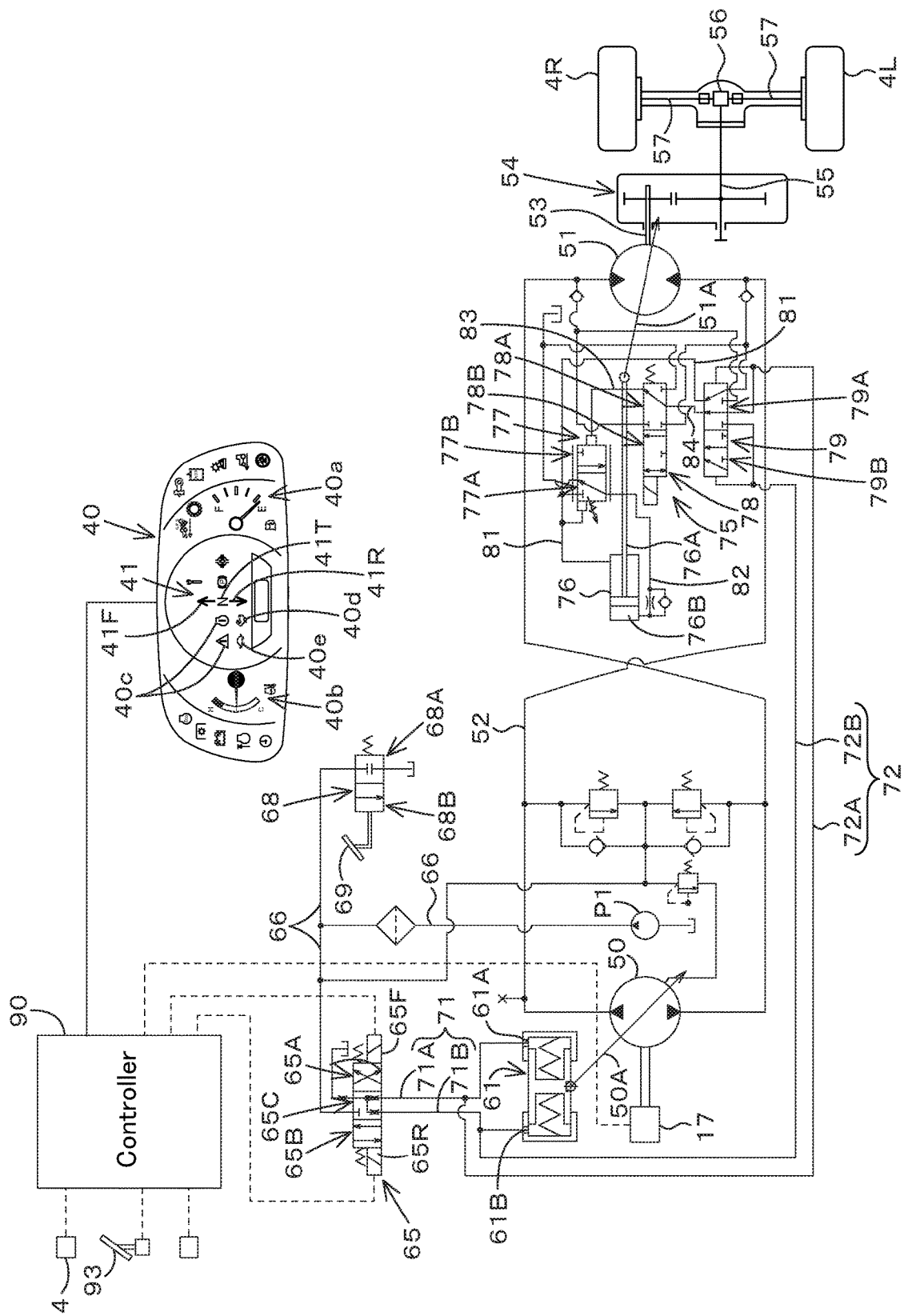
FIG. 3 is a view showing a traveling control circuit of the working machine.

FIG. 3 shows a traveling control circuit of the working machine 1.

As shown in FIG. 3, the traveling control circuit is provided with a hydraulic pump (charge pump) P1, an HST pump (hydraulic pump) 50, and a traveling motor 51. The hydraulic pump P1 is, for example, a constant displacement type pump and delivers hydraulic fluid stored in the tank.

The HST pump 50 and the traveling motor 51 are connected by a circulation fluid passage 52. The HST pump 50 is a swashplate type variable displacement pump configured to supply hydraulic fluid to the traveling motor 51. An output (delivering rate of hydraulic fluid) of the HST pump 50 varies depending on a power of the prime mover 17. The HST pump 50 includes a swashplate 50A which swings from a neutral position to one directional side and to the other directional side, and a direction of hydraulic fluid delivered from the HST pump 50 into the circulation fluid passage 52 can be changed by the swinging (tilting) of the swashplate 50A.

The traveling motor 51 is a swashplate type variable displacement motor configured to be rotated by hydraulic fluid delivered from the HST pump 50. A power output from the output shaft 53 of the traveling motor 51 is transmitted to a transmission shaft 55 via a gear transmission mechanism 54, and a power is transmitted from a rear end portion of the transmission shaft 55 to left and right rear axles 57 via a rear wheel differential device 56, thereby driving the rear wheels 4L and 4R with the rear axles 57. In addition, a power is transmitted from a front end portion of the transmission shaft 55 to the front wheels 3L and 3R via a drive shaft, a front wheel differential device, front axles and the like, thereby driving the front wheels 3L and 3R.

The traveling motor 51, when rotating normally, transmits a forward-traveling power to traveling devices (front wheels 3L and 3R, rear wheels 4L and 4R), and the traveling motor 51, when rotating reversely, transmits a backward-traveling power to the traveling devices (front wheels 3L and 3R, rear wheels 4L and 4R). Either the normal rotation (forward-traveling of the traveling devices) or reverse rotation (backward-traveling of the traveling devices) of the traveling motor 51 is determined by the delivery direction of hydraulic fluid delivered from the HST pump 50 to the circulation fluid passage 52, that is, by an angle (swashplate angle) of the swashplate 50A of the HST pump 50.

The swashplate 50A of the HST pump 50 is connected to a first servo-cylinder 61 for setting the angle of the swashplate 50A. The first servo-cylinder 61 includes a forward-traveling port 61A and a backward-traveling port 61B, and when hydraulic fluid (pilot fluid) is supplied to the forward-traveling port 61A, the swashplate 50A is tilted to the forward-traveling directional side, and when the pilot fluid is supplied to the backward-traveling port 61B, the swashplate 50A is tilted to the backward-traveling directional side. When neither the forward-traveling port 61A nor the backward-traveling port 61B is supplied with the pilot fluid, the swashplate 50A is held at the neutral position.

The traveling control circuit is provided with a forward/backward-traveling switching valve (switching valve) 65. The forward/backward-traveling switching valve 65 is connected to the hydraulic pump P1 via a delivering fluid passage 66 and is supplied with hydraulic fluid (pilot fluid) delivered from the hydraulic pump P1. In addition, the forward/backward-traveling switching valve 65 and the first servo-cylinder 61 are connected to each other by the first fluid passage 71, and the forward/backward-traveling switching valve 65 switches the swashplate 51A (first servo-cylinder 61) of the HST pump 50 between the forward-traveling direction and the backward-traveling direction by a pressure (pilot pressure) of the pilot fluid acting in the first fluid passage 71.

The first fluid passage 71 includes a forward-traveling fluid passage 71A connecting the forward-traveling port 61A of the first servo-cylinder 61 to an output port of the forward/backward-traveling switching valve 65, and a backward-traveling fluid passage 71B connecting the backward-traveling port 61B of the first servo-cylinder 61 to an output port of the forward-traveling/backward-traveling switching valve 65.

The forward/backward-traveling switching valve 65 is a three-position witching valve that can be switched to traveling positions (first position 65A and second position 65B) and a neutral position 65C. The forward/backward-traveling switching valve 65 is switched to the first position 65A when a solenoid 65F is magnetized, switched to the second position 65B when a solenoid 65R is magnetized, and switched to the neutral position 65C when neither the solenoid 65F nor the solenoid 65R is magnetized.

That is, when the forward/backward-traveling switching valve 65 is switched to the first position 65A, a pilot pressure acts on the forward-traveling fluid passage 71A to operate the first servo-cylinder 61 in the forward-traveling direction, and when the forward/backward-traveling switching valve 65 is switched to the second position 65B, the pilot pressure acts in the backward-traveling fluid passage 71B to operate the first servo-cylinder 61 in the backward-traveling direction.

An inching valve 68 is connected to the delivery fluid passage 66 connecting the forward/backward-traveling switching valve 65 to the hydraulic pump P1. The inching valve 68 is a valve to be operated according to an operation amount (depressing amount) of the inching pedal 69 provided in the vicinity of the driver's seat 13. When the inching pedal 69 is depressed, the inching valve 68 switches to the second position 68B and discharges hydraulic fluid (pilot fluid) delivered from the delivery fluid passage 66 to the hydraulic fluid tank or the like, so that the pilot fluid is not supplied to the forward/backward-traveling switching valve 65. That is, when the inching pedal 69 is depressed, the pilot fluid is not supplied to the forward/backward-traveling switching valve 65, so that the swashplate 50A of the HST pump 50 moves toward a neutral position, and the traveling devices are decelerated. Since an opening degree of the inching valve 68 changes according to the depressing amount of the inching pedal 69 (since an discharging amount of pilot fluid changes), the deceleration of the traveling devices can be adjusted by the inching pedal 69.

When the inching pedal 69 is not depressed, the inching valve 68 is switched to the first position 68A, and hydraulic fluid (pilot fluid) delivered from the delivery fluid passage 66 is supplied to the forward/backward-traveling switching valve 65. That is, when the inching pedal 69 is not depressed, the pilot fluid is supplied to the forward/backward-traveling switching valve 65, so that the swashplate 50A of the HST pump 50 swings in the forward-traveling direction or the backward-traveling direction according to the switching of the forward/backward-traveling switching valve 65.

A second fluid passage 72 is connected to the first fluid passage 71 and branches off from an intermediate portion of the first fluid passage 71. The second fluid passage 72 is a fluid passage connected to the speed-shift mechanism 75 and includes a connecting fluid passage 72A connected to the forward-traveling fluid passage 71A and a connecting fluid passage 72B connected to the backward-traveling fluid passage 71B.

The speed-shift mechanism 75 is a mechanism configured to adjust a rotation speed of the traveling motor 51 and thereby changing a speed of the traveling device. The speed-shift mechanism 75 includes a second servo-cylinder 76, a speed-shift valve 77, an actuation valve 78, and an interlocking valve 79.

The second servo-cylinder 76 is operably connected to the swashplate 51A of the traveling motor 51 and is extended and contracted to determine an angle (swashplate angle) of the swashplate MA. The speed-shift valve 77 is a switching valve configured to extend and contract the second servo-cylinder 76 to switch the swashplate MA of the traveling motor 51 between a low speed position and a high speed position. The speed-shift valve 77 is connected to the second servo-cylinder 76 via fluid passages 81 and 82 and is shiftable between a plurality of shift positions, i.e., a first position (low speed position) 77A and a second position (high speed position) 77B. When switched to the first position 77A, the speed-shift valve 77 drains hydraulic fluid from a cylinder chamber 76B in the second servo-cylinder 76 opposite to a rod 76A of the second servo-cylinder 76, thereby contracting the second servo-cylinder 76 to the low speed position. When switched to the second position 77B, the speed-shift valve 77 supplies hydraulic fluid to the cylinder chamber 76B of the second servo-cylinder 76 to extend the second servo-cylinder 76 to the high speed position.

The actuation valve 78 is a two-position switching valve having a locking position 78A and an allowance position 78B and is switchable therebetween. The actuation valve 78 and the speed-shift valve 77 are connected to each other via a fluid passage 83. When set at the locking position 78A, the speed-shift valve 77 is locked to a predetermined position (the first position 77A) of the plurality of shift positions (the first position 77A and second position 77B). When set at the allowance position 78B, the speed-shift valve 77 is allowed to be switched between the plurality of shift positions (first position 77A, second position 77B).

The interlocking valve 79 is connected to each of the second fluid passages 72 (including the connecting fluid passages 72A and 72B). When a pilot pressure acts in the connecting fluid passage 72A, the interlocking valve 79 is switched to the first position 79A, and when the pilot pressure acts in the connecting fluid passage 72B, the interlocking valve 79 is switched to the second position 79B. In this way, the switching of the interlocking valve 79 is linked with the switching of the forward/backward-traveling switching valve 65. The interlocking valve 79 is connected to the actuation valve 78 via a fluid passage 84 and to the speed-shift valve 77 via the fluid passage 81.

Thus, when the actuation valve 78 is switched to the locking position 78A, the traveling motor 51 is locked to the low speed portion regardless of whether it is in the forward-traveling or the backward-traveling, and when the actuation valve 78 is switched to the allowance position 78B, the traveling motor 51 is allowed to be automatically switched between the low speed position and the high speed position regardless of whether it is in the forward-traveling or the backward-traveling.

As shown in FIG. 1, the working machine 1 is provided with a display 40. The display 40 displays various information about the working machine 1. The display 40 is arranged, for example, in front of or on a lateral side of the operator's seat 13.

The display 40 includes a panel or the like on which operational information, warning information and the like are displayed. The display 40 has, for example, a fuel gauge $40a$ and a water temperature gauge $40b$ for displaying the operational information and a plurality of warning lamps $40c$ for displaying warning information. In addition, the display 40 is configured to display, as the operational information, a speed of the traveling motor 51 (speed of the traveling device), and has a high speed lamp $40d$ which is lit when the speed of the traveling device is in the high speed stage, and a low speed lamp $40e$ which is lit when the speed of the traveling device is in the low speed stage. Moreover, the display 40 has a traveling indicator 41 which indicates whether the traveling device is in a forward-traveling state, a backward-traveling state, or in a neutral state.

The traveling indicator 41 has a forward-traveling indicator 41F which indicates the forward-traveling state with arrows or other graphics, a backward-traveling indicator 41R which indicates the backward-traveling state with arrows or other graphics, and a state indicator 41T which indicates the states of the forward-traveling, the backward-traveling, and the neutral with letters or the like. The forward-traveling indicator 41F, the backward-traveling indicator 41R and the state indicator 41T indicate their respective states by lighting up, and indicate that they are not in the states by being extinguished.

A controller 90 is provided to perform various controls of the working machine 1, for example, switching of the forward/backward-traveling switching valve 65.

The controller 90 is connected to an accelerator 93 and a forward/backward-traveling switching member (switching operation member) 94. The accelerator 93 is configured to set a rotation speed of the prime mover 17 (prime mover speed) and is constituted of, for example, a pedal, a lever, a volume or the like. For example, when the accelerator 93 is a pedal, the prime mover speed is set by an depressing amount of the pedal. When the accelerator 93 is a lever, the prime mover speed is set by a swinging amount of the lever. And, when the accelerator 93 is a volume pot, the prime mover speed is set by a rotating amount of the volume pot.

The forward/backward-traveling switching member 94 is installed in a periphery of the driver's seat 13 and is operated by the operator (driver). The forward/backward-traveling switching member 94 is operable to activate the forward-traveling state (forward-traveling mode), the backward-traveling state (backward-traveling mode), and the neutral (neutral mode), and is shiftable among three positions (three mode positions), i.e., the forward-traveling position (forward-traveling mode position), the neutral position (neutral mode position), and the backward-traveling position (backward-traveling mode position). The forward/backward-traveling switching member 94 is constituted of a lever, a switch, a volume, or the like. When the forward/backward-traveling switching member 94 is set at either the forward-traveling position or the backward-traveling position, the controller 90 activates the traveling mode, and when the forward/backward-traveling switching member 94 is set at the neutral position, the controller 90 inactivates the traveling mode. In this regard, the traveling mode includes the forward-traveling mode and the backward-traveling mode.

The controller 90 switches the forward/backward-traveling switching valve 65 in accordance with an operation of the forward/backward-traveling switching member 94. For example, when the forward/backward-traveling switching member 94 is switched to the forward-traveling position, if a predetermined condition is satisfied, the controller 90 magnetizes the solenoid 65F of the forward/backward-traveling switching valve 65, and thereby switches the forward/backward-traveling switching valve 65 to the first position 65A (the forward-traveling position). When the forward/backward-traveling switching member 94 is switched to the backward-traveling position, if the predetermined condition is satisfied, the controller 90 magnetizes the solenoid 65R of the forward/backward-traveling switching valve 65, and thereby switches the forward/backward-traveling switching valve 65 to the second position 65B (the backward-traveling position). When the controller 90 switches the forward/backward-traveling switching valve 65 to either the first position 65A (forward-traveling position) or the second position 65B (backward-traveling position), the controller 90 enters a traveling allowance mode, and when the controller 90 switches the forward/backward-traveling switching valve 65 to the neutral position 65C, the controller 90 enters the traveling prohibition mode.

Figure 4:
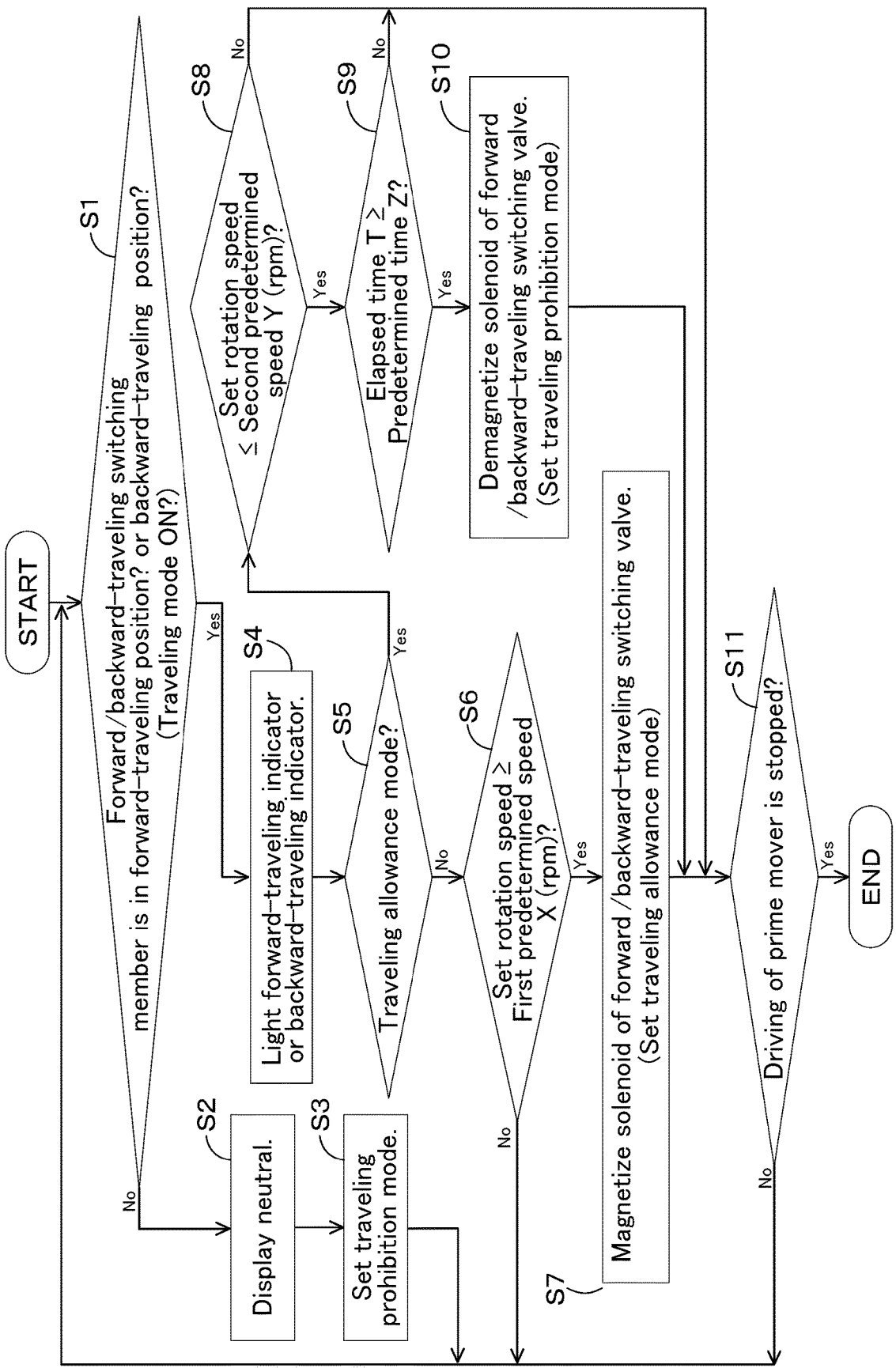
FIG. 4 is a view showing a flow of switching of a forward/backward-traveling switching valve in a controller and a display.

FIG. 4 is a view showing a flow of processes for switching the forward/backward-traveling switching valve 65 performed by the controller 90.

As shown in FIG. 4, the controller 90 judges whether or not the traveling mode is activated, that is, whether or not the forward/backward-traveling switching member 94 has been switched to either the forward-traveling position or the backward-traveling position, under a state where the prime mover 17 is driven (step S1). When the traveling mode is not activated, that is, the neutral mode is realized (step S1, No), the controller 90 displays on the display 40 that the mode position is set as the neutral (step S2), sets the traveling prohibition mode, and maintains the neutral position 65C of the forward/backward-traveling switching valve 65 (step S3).

When the traveling mode is activated (step S1, Yes), the controller 90 causes either one of the forward-traveling and backward-traveling indicators 41F and 41R of the display 40 to light on (step S4) in response to the operation of the forward/backward-traveling switching member 94. When the forward/backward-traveling switching member 94 is operated to the forward-traveling position, the controller 90 lights on the forward-traveling indicator 41F, and when the forward/backward-traveling switching member 94 is operated to the backward-traveling position, the controller 90 lights on the backward-traveling indicator 41R.

In addition, the controller 90 judges whether the traveling-allowance mode is activated (step S5). When the traveling-allowance mode is inactivated (step S5, No), the controller 90 judges whether a set rotation speed defined as the prime mover speed set by the accelerator 93 (set rotation speed) is equal to or higher than a first predetermined speed X (rpm) (step S6). When the set rotation speed is equal to or higher than the first predetermined speed X (rpm) (step S6, Yes), the controller 90 magnetizes the solenoid 65F or 65R of the forward/backward-traveling switching valve 65 in response to the operation of the forward/backward-traveling switching member 94 (step S7). In step S1, when the forward/backward-traveling switching member 94 is operated to the forward-traveling position, the controller 90 magnetizes the solenoid 65F of the forward/backward-traveling switching valve 65, and when the forward/backward-traveling switching member 94 is operated to the backward-traveling position, the controller 90 magnetizes the solenoid 65R of the forward/backward-traveling switching valve 65, whereby the traveling-allowance mode is activated.

When the set rotation speed is not higher than the predetermined first predetermined rotation speed X (rpm) (step S6, No), the controller 90 returns the process to step S1.

When in the traveling-allowance mode (step S5, Yes), that is, under the state where the solenoids 65F and 65R of the forward/backward-traveling switching valve 65 are magnetized, the controller 90 judges whether the set rotation speed is less than or equal to a second predetermined rotation speed Y (rpm) preliminarily determined than the first predetermined rotation speed X (rpm), the second predetermined rotation speed Y being lower than the first predetermined rotation speed X (step S8). In the present embodiment, the first predetermined rotation speed X (rpm) is set to 1150 rpm, and the second predetermined rotation speed Y (rpm) is set to 1100 rpm. However, the values of the first predetermined rotation speed X (rpm) and the second predetermined rotation speed Y (rpm) are not particularly limited.

When the set rotational speed is less than or equal to the second predetermined rotational speed Y (rpm) (step S8, Yes), the controller 90 judges whether an elapsed time T after the set rotational speed became less than or equal to the second predetermined rotational speed Y (rpm) exceeds a predetermined time Z seconds (step S9). When the elapsed time T exceeds the predetermined time Z seconds (step S9, Yes), the controller 90 demagnetizes the solenoids 65F and 65R of the forward/backward-traveling switching valve 65, that is, the controller 90 releases the state of switching the forward-traveling/backward-traveling switching valve 65 to the forward-traveling position and the backward-traveling position (step S10). In step S1, the controller 90 demagnetizes the solenoid 65F of the forward/backward-traveling switching valve 65 when the forward/backward-traveling switching member 94 is operated to the forward-traveling position, and demagnetizes the solenoid 65R of the forward/backward-traveling switching valve 65 when the forward/backward-traveling switching member 94 is operated to the backward-traveling position, thereby activating the travel prohibition mode.

In addition, when the set rotation speed is not less than the second predetermined rotation speed Y (rpm) (step S8, Yes), and when the elapsed time T is not longer than the predetermined time Z (seconds) (step S9, Yes), the controller 90 judges whether the driving of the prime mover 17 is stopped after switching to activating the travel prohibition mode at step S10 (step S11). And, when the driving of the prime mover 17 is stopped (step S11, Yes), the switching process of the forward/backward-traveling switching valve 65 is terminated. On the other hand, while the driving of the prime mover 17 is not stopped (step S11, No), the controller 90 returns the process to step S1.

As described above, the working machine 1 according to the present embodiment, includes the traveling device, the traveling motor 51 to output power to the traveling device, the HST pump (hydraulic pump) 50, including the swashplate, to supply hydraulic fluid to the traveling motor 51, the prime mover 17 to drive the hydraulic pump 50, the first servo-cylinder 61 to set an angle of the swashplate of the hydraulic pump 50, the hydraulic pump (charge pump) P1 to supply pilot fluid to the first servo-cylinder 61, the forward/backward-traveling switching valve (switching valve) 65 shiftable between the traveling position to supply the pilot fluid from the charge pump P1 to the first servo-cylinder 61 and the neutral position 65C to stop the pilot fluid supply to the first servo-cylinder 61, the forward/backward-traveling switching member (switching operation member) 94 operable to select either the traveling mode or the neutral mode, and the controller 90 to shift the switching valve 65 between the traveling position and the neutral position. The controller 90 is configured or programmed to hold the switching valve 65 at the neutral position 65C after the switching operation member 94 is operated to select the traveling mode until the rotation speed of the prime mover 17 becomes not less than the first predetermined rotation speed X (rpm).

According to the above-described configuration, even when an operator switches the forward/backward-traveling switching member (switching operation member) 94 to the traveling mode, the neutral position 65C of the forward/backward-traveling switching valve 65 is maintained after the operator operates the accelerator until the rotation speed of the prime mover becomes not less than the first predetermined rotation speed X (rpm), so that the swashplate of the HST pump 50 does not swing. This prevents the working machine from moving under a state where the accelerator is not being operated. In addition, the working machine can be prevented surely from moving under the state where the accelerator is not being operated, without having to perform complicated work of adjusting a starting rotation speed according to the temperature, for example.

The working machine 1 further includes the accelerator operable to set the rotation speed of the prime mover 17. The controller 90 is configured or programmed to shift the switching valve 65 when the set rotation speed defined as the rotation speed set by the accelerator is not less than the first predetermined rotation speed X (rpm). According to this configuration, the working machine can travel based on an intension of traveling through operation of an acceleration by an operator or the like after the mode is switched to the traveling mode by the forward/backward-traveling switching member 94.

The working machine 1 further includes the display 40 configured to display the mode selected by operating the switching operation member when the switching operation member 94 is operated to select the mode. According to this configuration, an operator is capable of confirming whether the current operation easily by the forward/backward-traveling switching member 94 is in the traveling mode or the neutral mode.

The controller 90 is configured or programmed to shift the switching valve 65 having been set at the traveling position to the neutral position 65C when the set rotation speed becomes not more than the second predetermined rotation speed Y (rpm) that is less than the first predetermined rotation speed X (rpm). According to this configuration, under a state where the working machine is traveling with the forward/reverse gear shift valve 65 being switched to the traveling position, it can be suppressed that the traveling positions and the neutral position are switched at every small acceleration by the operator.

The controller 90 is configured or programmed to shift the switching valve 65 having been set at the traveling position to the neutral position 65C after a period of time not shorter than a predetermined period elapses since the set rotation speed becomes not more than the second predetermined rotation speed Y (rpm). According to this configuration, a shock of releasing the forward/backward-traveling switching valve 65 can be reduced.

In addition, the traveling mode includes the forward traveling mode and the backward traveling mode, the switching operation member 94 is operable to select one of the forward traveling mode, the neutral mode and the backward traveling mode, the traveling motor 51 is configured to selectively output either the forward traveling power or the backward traveling power to the traveling device in correspondence to a state of hydraulic fluid supply from the hydraulic pump P1, the swashplate of the hydraulic pump P1 is tiltable between the forward traveling side to make the hydraulic pump P1 deliver hydraulic fluid to drive the traveling motor 51 in the forward traveling direction and the backward traveling side to make the hydraulic pump P1 deliver hydraulic fluid to drive the traveling motor 51 in the backward traveling direction, and the switching valve 65 is shiftable among the forward traveling position to supply the first servo-cylinder 61 with pilot fluid such as to tilt the swashplate to the forward traveling side, the neutral position, and the backward traveling position to supply the first servo-cylinder 61 with pilot fluid such as to tilt the swashplate to the backward traveling side.

According to this configuration, the working machine can be prevented from moving forward and backward under the state where the accelerator is not being operated.

The working machine 1 further includes the speed-shift mechanism 75 configured to shift a speed of the traveling device by adjusting the rotation speed of the traveling motor 51, the first fluid passage 71 fluidly connecting the first servo-cylinder 61 to the switching valve 65, and the second fluid passage 72 branched from the first fluid passage 71 and connected to the speed-shift mechanism 75. According to this configuration, the speed-shift mechanism 75 can be actuated according to the switching of the forward/backward-traveling switching valve 65, and a speed of the traveling device can be changed according to the switching between the forward-traveling and the reverse-traveling.

The speed-shift mechanism 75 includes the second servo-cylinder 76 to set an angle of a swashplate to change the rotation speed of the traveling motor 51, the speed-shift valve 77 shiftable among a plurality of shift positions to control a telescopic action of the second servo-cylinder 76 in correspondence to at which of the shift positions the speed-shift valve 77 is set, the actuation valve 78 shiftable between the locking position 78A to lock the speed-shift valve 77 at a predetermined shift position and the allowance position 78B to allow the shiftability of the speed-shift valve 77, and the interlocking valve 79 shiftable interlockingly with the switching valve 65 and fluidly connectable to the speed-shift valve 77 and the actuation valve 78. According to this configuration, a speed of the traveling device can be fixed or changed by the speed-shift valve 77.

The working machine 1 further includes the inching pedal 69, the inching valve 68 configured to reduce the pilot fluid supplied to the switching valve 65 when the inching pedal 69 is operated. According to this configuration, the traveling device can be easily stopped through operation of the inching pedal 69.

Although the wheel loader is exemplified in the present embodiment, the present invention can be applied to various types of working machines, not limited to the wheel loader, for example, agricultural machines such as tractors and combine harvesters or construction machines such as backhoes, compact track loaders, skid steer loaders.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
   a traveling device;
   a traveling motor to output power to the traveling device;
   a hydraulic pump, including a swashplate, to supply hydraulic fluid to the traveling motor;
   a prime mover to drive the hydraulic pump;
   a first servo-cylinder to set an angle of the swashplate of the hydraulic pump;
   a charge pump to supply pilot fluid to the first servo-cylinder;
   a switching valve shiftable between a traveling position to supply the pilot fluid from the charge pump to the first servo-cylinder and a neutral position to stop the pilot fluid supply to the first servo-cylinder;
   a switching operation member operable to select either a traveling mode or a neutral mode;
   a controller to shift the switching valve between the traveling position and the neutral position; and
   an accelerator operable to set a rotation speed of the prime mover, wherein
   the controller is configured or programed to
      hold the switching valve at the neutral position after the switching operation member is operated to select the traveling mode until a set rotation speed defined as the rotation speed set by the accelerator becomes not less than a first predetermined rotation speed, and shift the switching valve to the traveling position when the set rotation speed defined as the rotation speed set by the accelerator is not less than the first predetermined rotation speed, and
      shift the switching valve having been set at the traveling position to the neutral position when the set rotation speed becomes not more than a second predetermined rotation speed that is less than the first predetermined rotation speed.

2. The working machine according to claim 1, further comprising:
   a display configured to display the mode selected by operating the switching operation member when the switching operation member is operated to select the mode.

3. The working machine according to claim 1, wherein the controller is configured or programmed to shift the switching valve having been set at the traveling position to the neutral position after a period of time not shorter than a predetermined period elapses since the set rotation speed becomes not more than the second predetermined rotation speed.

4. The working machine according to claim 1, wherein
   the traveling mode includes a forward traveling mode and a backward traveling mode,
   the switching operation member is operable to select one of the forward traveling mode, the neutral mode and the backward traveling mode,
   the traveling motor is configured to selectively output either a forward traveling power or a backward traveling power to the traveling device in correspondence to a state of hydraulic fluid supply from the hydraulic pump,
   the swashplate of the hydraulic pump is tiltable between a forward traveling side to make the hydraulic pump deliver hydraulic fluid to drive the traveling motor in the forward traveling direction and a backward traveling side to make the hydraulic pump deliver hydraulic fluid to drive the traveling motor in the backward traveling direction, and
   the switching valve is shiftable among a forward traveling position to supply the first servo-cylinder with pilot fluid such as to tilt the swashplate to the forward traveling side, the neutral position, and a backward traveling position to supply the first servo-cylinder with pilot fluid such as to tilt the swashplate to the backward traveling side.

5. The working machine according to claim 1, further comprising:
   an inching pedal; and
   an inching valve configured to reduce the pilot fluid supplied to the switching valve when the inching pedal is operated.

6. A working machine comprising:
   a traveling device;
   a traveling motor to output power to the traveling device;
   a hydraulic pump, including a swashplate, to supply hydraulic fluid to the traveling motor:
   a prime mover to drive the hydraulic pump;
   a first servo-cylinder to set an angle of the swashplate of the hydraulic pump;
   a charge pump to supply pilot fluid to the first servo-cylinder;
   a switching valve shiftable between a traveling position to supply the pilot fluid from the charge pump to the first servo-cylinder and a neutral position to stop the pilot fluid supply to the first servo-cylinder;
a switching operation member operable to select either a traveling mode or a neutral mode;
a controller to shift the switching valve between the traveling position and the neutral position; and
an accelerator operable to set a rotation speed of the prime mover, wherein
the controller is configured or programed to hold the switching valve at the neutral position after the switching operation member is operated to select the traveling mode until a set rotation speed defined as the rotation speed set by the accelerator becomes not less than a first predetermined rotation speed,
the working machine further comprises:
a speed-shift mechanism configured to shift a speed of the traveling device by adjusting the rotation speed of the traveling motor;
a first fluid passage fluidly connecting the first servo-cylinder to the switching valve; and
a second fluid passage branched from the first fluid passage and connected to the speed-shift mechanism.

7. The working machine according to claim 6, wherein
the speed-shift mechanism includes
a second servo-cylinder to set an angle of a swashplate to change the rotation speed of the traveling motor,
a speed-shift valve shiftable among a plurality of shift positions to control a telescopic action of the second servo-cylinder in correspondence to which of the shift positions the speed-shift valve is set,
an actuation valve shiftable between a locking position to lock the speed-shift valve at a predetermined shift position and an allowance position to allow the shiftability of the speed-shift valve, and
an interlocking valve shiftable interlockingly with the switching valve and fluidly connectable to the speed-shift valve and the actuation valve.

* * * * *